(12) United States Patent
Cloonan et al.

(10) Patent No.: US 9,210,453 B1
(45) Date of Patent: Dec. 8, 2015

(54) MEASURING QUALITY OF EXPERIENCE AND IDENTIFYING PROBLEM SOURCES FOR VARIOUS SERVICE TYPES

(75) Inventors: Thomas J. Cloonan, Lisle, IL (US); Erich C. Arnold, Cape Coral, FL (US); Harindranath P. R. Nair, Hillsboro, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 392 days.

(21) Appl. No.: 13/606,387

(22) Filed: Sep. 7, 2012

Related U.S. Application Data

(60) Provisional application No. 61/635,573, filed on Apr. 19, 2012, provisional application No. 61/691,878, filed on Aug. 22, 2012.

(51) Int. Cl.
| | |
|---|---|
| *H04L 12/26* | (2006.01) |
| *H04L 12/28* | (2006.01) |
| *H04N 21/2385* | (2011.01) |
| *H04N 21/258* | (2011.01) |

(52) U.S. Cl.
CPC ..... *H04N 21/2385* (2013.01); *H04N 21/25833* (2013.01)

(58) Field of Classification Search
CPC ................. H04L 41/12; H04L 43/10
USPC .................. 370/250–256, 238, 338, 342, 231
See application file for complete search history.

(56) References Cited

U.S. PATENT DOCUMENTS

| | | | |
|---|---|---|---|
| 6,496,501 B1 * | 12/2002 | Rochkind et al. | 370/354 |
| 6,888,801 B1 * | 5/2005 | Hock | 370/252 |
| 7,165,115 B2 * | 1/2007 | Bouillet et al. | 709/232 |
| 2003/0101263 A1 * | 5/2003 | Bouillet et al. | 709/225 |
| 2003/0118051 A1 * | 6/2003 | Ooms | 370/471 |
| 2003/0223367 A1 * | 12/2003 | Shay et al. | 370/231 |
| 2006/0104205 A1 * | 5/2006 | Strutt et al. | 370/238 |
| 2007/0204068 A1 * | 8/2007 | Oku et al. | 709/251 |
| 2008/0080390 A1 * | 4/2008 | Ebuchi et al. | 370/253 |
| 2008/0225713 A1 * | 9/2008 | Tychon et al. | 370/231 |
| 2009/0296566 A1 * | 12/2009 | Yasrebl et al. | 370/221 |
| 2009/0296567 A1 * | 12/2009 | Yasrebi et al. | 370/221 |
| 2011/0063979 A1 * | 3/2011 | Matthews et al. | 370/237 |

\* cited by examiner

*Primary Examiner* — Khaled Kassim
*Assistant Examiner* — Berhanu Belete
(74) *Attorney, Agent, or Firm* — Bart A. Perkins

(57) ABSTRACT

Methods, systems, and computer readable media can provide for measuring the quality of experience levels and locating the sources of problems for service types in a network. This can be facilitated by sending one or more scout packets through the network, identifying those scout packets at the various network elements on a path within the network between a source and a destination, and compiling scout information identified by each of the various network elements to determine potential service degradation within the network.

26 Claims, 8 Drawing Sheets

| | Quality of Experience Mean Opinion Score (MOS) Display (5=Perfect; 1=Unacceptable) | |
|---|---|---|
| SERVICE TYPES | MOS FOR GOLD SERVICE FLOWS (Priority = High; BW = 20 Mbps) | MOS FOR BRONZE SERVICE FLOWS (Priority = Low; BW = 5 Mbps) |
| Web-Surfers | 5 | 3.6 |
| MSO-Managed Unicast IP Video Viewers | 5 | 1.7 |
| MSO-Managed Multicast IP Video Viewers | 5 | 3.9 |
| Over-the-Top Unicast IP Video Viewers | 5 | 4.8 |
| Peer-to-Peer Downloaders | 5 | 3.9 |
| On-line Gamers | 5 | 3.9 |
| Voice Over IP Telephony Users | 5 | 3.9 |
| Average MOS | 5 | 3.7 |

MEASURING QUALITY OF EXPERIENCE AND IDENTIFYING PROBLEM SOURCES FOR VARIOUS SERVICE TYPES

CROSS REFERENCE TO RELATED APPLICATION

This application is a non-provisional application claiming the benefit of U.S. Provisional Application Ser. No. 61/635,573, entitled "Measuring the Quality of Experience Levels and Locating the Sources of Problems for Various Service Types in a Cable Distribution System," which was filed on Apr. 19, 2012, and of U.S. Provisional Application Ser. No. 61/691,878, entitled "Measuring the Quality of Experience Levels and Locating the Sources of Problems for Various Service Types in a Cable Distribution System," which was filed on Aug. 22, 2012, each of which is hereby incorporated herein by reference in its entirety.

TECHNICAL FIELD

This disclosure relates to measuring a level of quality of experience and locating sources of problems for service types in a network.

BACKGROUND

Communication systems can transmit information over wired and/or wireless transmission media. Broadband operators, such as community antenna television (CATV) system operators, typically transmit this information by way of a packet-based transport system. Such transport system is typically subject to noise, interference and distortion, each of which can introduce errors in the transmission of information. High levels of network congestion or queue overflows can diminish quality of experience (QoE) levels by degrading service levels and causing packet delays or packet losses. However, the specific source of a problem is typically obscured by the complexity of the network to the service operators.

BRIEF DESCRIPTION OF THE DRAWINGS

Like reference numbers and designations in the various drawings indicate like elements.

DETAILED DESCRIPTION

In some implementations of this disclosure, systems and methods can operate to measure the QoE of a service type within a network. Information transmitted through a packet-based transport system is typically subject to noise, interference and distortion, any of which can introduce errors in the transmission of information resulting in packet errors (e.g., packet delays, packet jitter, packet loss, etc.). Moreover, increasing network congestion and/or queue overflows can degrade service levels and lead to packet delays, packet jitter, or packet loss. However, network operators do not have a way to accurately measure the QoE (e.g., QoE can be based on the amount of packets delayed, erred, or lost) of a transport system. Rather, network operators rely on simulations and network modeling to try to predict the QoE of a transport system. Furthermore, network operators typically rely on customer complaints and service call frequencies to identify declining QoE levels for their subscribers.

Without an accurate real-time measurement of QoE, customers may experience QoE degradations (e.g., including tiling, frozen frame artifacts, slow download speeds, packet latency, packet loss, etc.) before network operators are aware that a problem in the network exists. Typically, network operators do not learn of problems with the network until a customer complains to them of a network problem. Network operators are without a way to proactively and accurately measure the QoE provided by their networks. Further, when network operators learn of a problem in their networks (typically from the users themselves), they may be unable to isolate or identify the source of the problem.

Figure 1A:
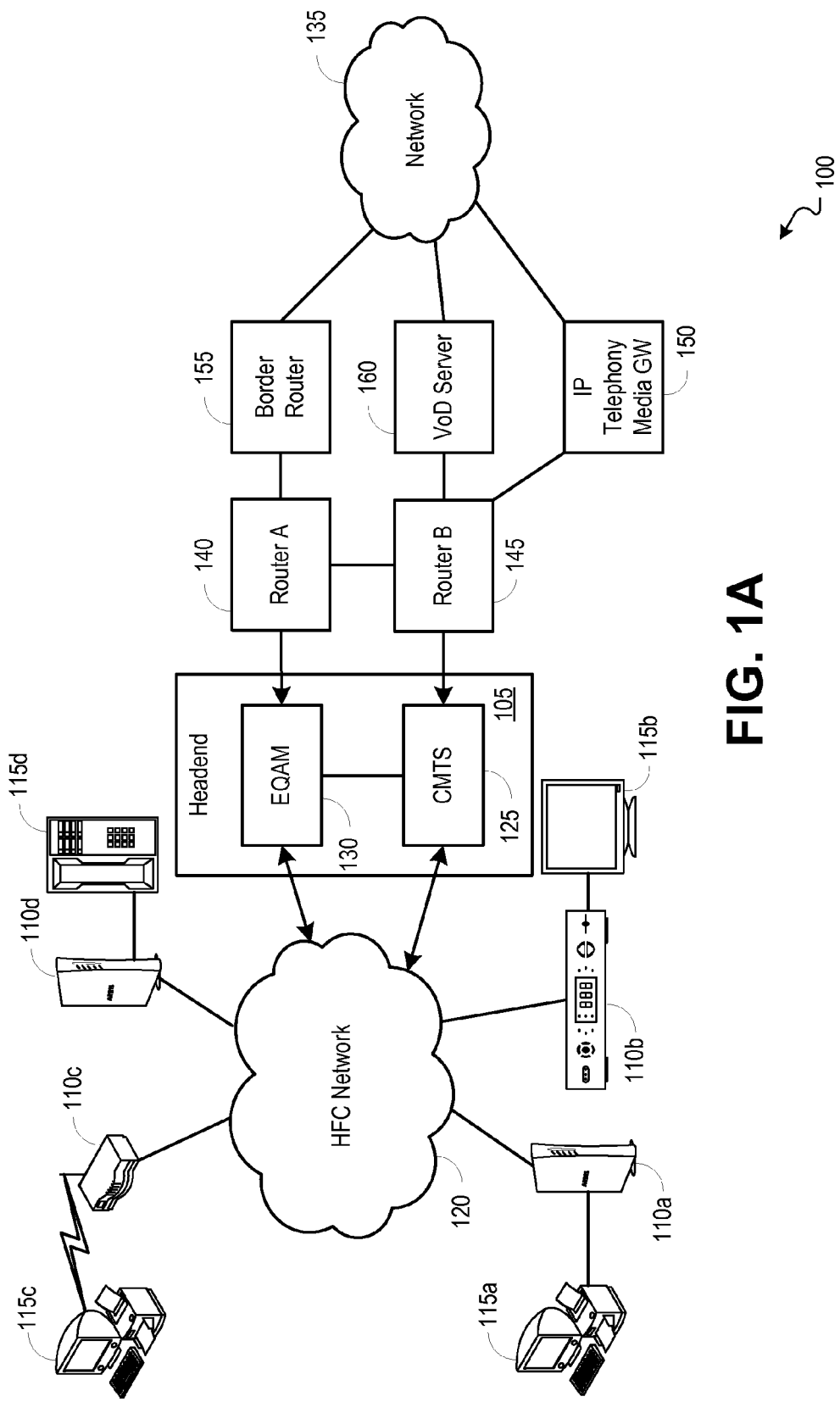
FIG. 1A is a block diagram illustrating an example network environment operable to facilitate measuring the QoE of a service within a network.

FIG. 1A is a block diagram illustrating an example network environment 100 operable to facilitate measuring the QoE of a service within a network. In some implementations, a headend 105 can provide video, data and/or voice service(s) to customer premise equipment (CPE) devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among many others (e.g., digital subscriber line (DSL) modem, voice over internet protocol (VoIP) terminal adapter, whole home gateway/digital video recorder (DVR) device, communications device, etc.). A cable modem or embedded MTA (eMTA) 110a can facilitate communications between the headend 105 and a computer 115a. A set top box 110b can facilitate communications from the headend 105 to a television 115b or a separate digital video recorder. A cable modem with an embedded wireless router 110c can facilitate wireless communications between a computer 115c and a headend 105. An MTA 110d can facilitate communications between a telephone 115d and a headend 105.

The CPE devices 110a-d can communicate with the headend 105 via a hybrid fiber-coax (HFC) network 120. In various implementations, other types of networks (e.g., public switched telephone network (PSTN), cellular network, WiMax networks, etc.), or combinations thereof, can be used. The headend 105 can include devices such as a cable modem termination system (CMTS) 125 and/or an edge quadrature amplitude modulation (EQAM) device 130, or a combined or converged device (not shown) including multiple edge and/or video or data processing functionalities. Such headend devices can operate to facilitate communications between a network 135 and the CPE devices 110a-d. In various implementations, the network 135 can include one or more networks internal to the headend and/or one or more networks external to the headend (e.g., one or more extranets, the Internet, etc.).

Data services can be handled by the headend 105 through a CMTS 125 or an EQAM 130. The CMTS 125 or EQAM 130 can receive data signals from network(s) 135 through external device(s) or node(s) (e.g., router "A" 140 or router "B" 145). In some implementations, data signals can be routed between external devices or nodes (e.g., between router "A" 140 or router "B" 145) depending on the level of data traffic between the network(s) 135 and the CPE devices 110*a-d*. The network (s) 135, for example, can operate using internet protocol (IP), sending data packets to and receiving data packets from the headend 105. In some examples, an IP telephony media gateway 150 can be operable to provide voice over internet protocol (VoIP) services with voice connectivity to other subscribers or voice connectivity to a public switched telephone network (PSTN) (not shown). In further examples, a border router 155 can be operable to provide streaming data or video delivered to a headend 105 from the network(s) 135. In still further examples, a VoD server 160 can be operable to provide delivery of multimedia to a CPE device 110*a-d* through a headend 105.

In some implementations, the CMTS 125 can forward packets destined for subscribers to an EQAM device 130, which can apply the signal to a carrier waveform. In various implementations, the carrier waveform can include either or both data and video streams, in either or both multicast and unicast (e.g., point-to-point) formats for transmission to a combiner. The EQAM combiner can combine multiple carrier waveform signals onto a single fiber (or coax) for transmission to one or more CPE devices 110*a-d* via the HFC network 120.

Figure 1B:
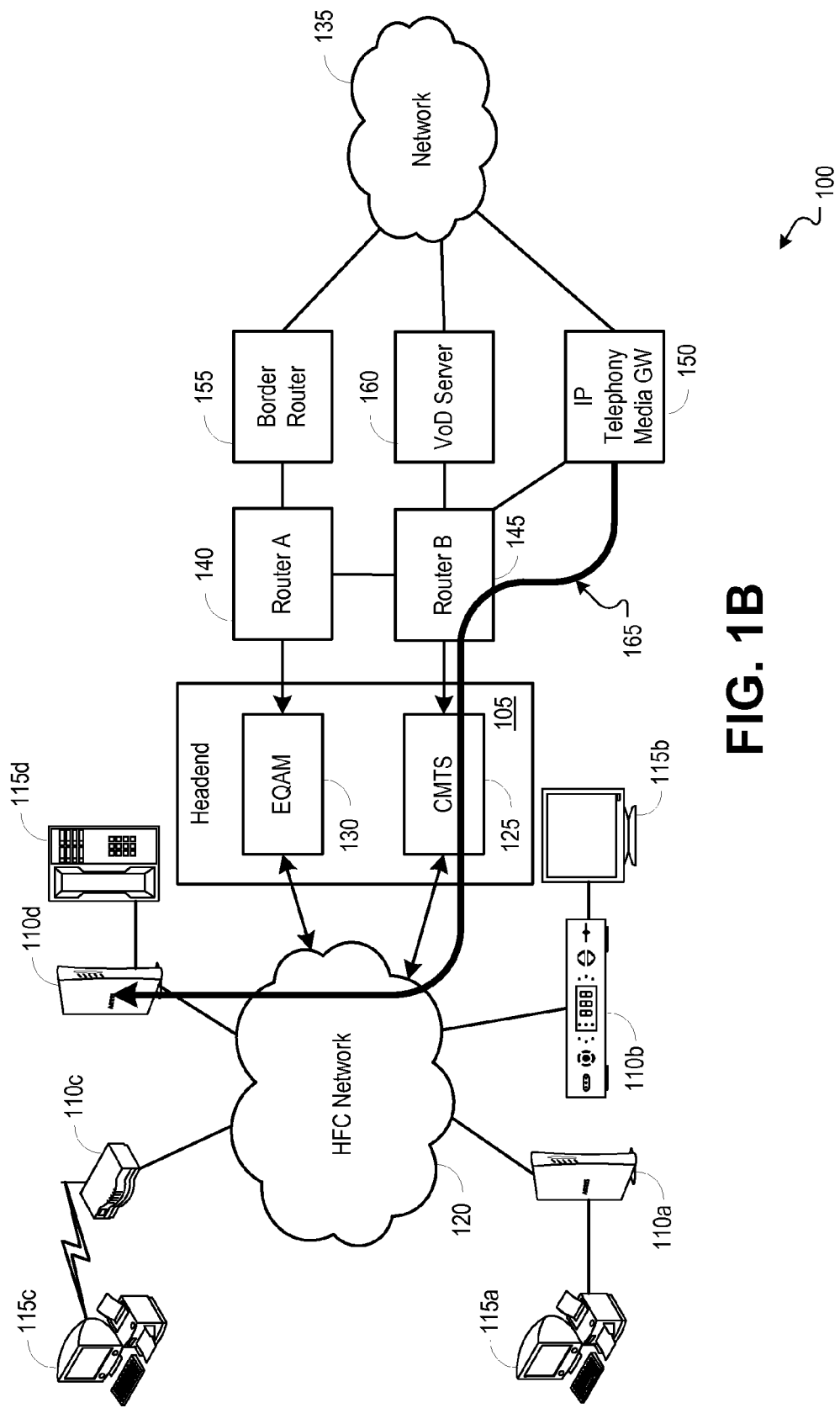
FIG. 1B is an illustration of an example path from a source element to a destination element for packets of a service type within a network.

FIG. 1B is an illustration of an example path 165 for packets of a particular service type within a network 100. In the example path 165, IP telephony packets can be created and sent from an IP telephony media gateway 150, referred to in this example as a source element. After the packets are sent from the source element, they can follow the example path 165 through a router "B" 145, a CMTS 125, an HFC network 120 and be received by an MTA 110*d*, referred to in this example as a destination element. The example path 165 can be operable to be used to transport VoIP telephony traffic. While a VoIP service is shown in FIG. 1B, it should be understood that many other service types (e.g., web-browsing, MSO-managed unicast IP video, MSO-managed multicast IP video, over-the-top unicast IP video, peer-to-peer file transfers, on-line gaming, etc.) can also be provided in a network environment 100. In some implementations, each service type can be communicated along various paths through the elements of a network environment 100. In various implementations, the service types can be associated with levels of priority (e.g., class of service). For example, the network elements within a network environment 100 can forward data packets of a service type based upon a level of priority associated with the service type.

In some implementations, the QoE of a service type can be monitored by analyzing data associated with specialized packets, referred to as scout packets. For example, a series of scout packets can be repeatedly injected into a network environment 100 by a source element (e.g., IP telephony media gateway 150), and can be propagated along the same path 165 as the data packets associated with the service type being monitored (e.g., through a router "B" 145, a CMTS 125, an HFC network 120, and received by an MTA 110*d*). As a result, the scout packets experience the same network conditions and treatment as the data packets associated with the service type being monitored (e.g., VoIP). In some implementations, the scout packets can be operable to measure (e.g., through statistical sampling) packet-level performance of paths between network elements within a network path 165, e.g., referred to as hops. Thus, measurements obtained from the scout packets can be used to determine the manner of service and treatment of VoIP data packets (or other type of traffic) within the network environment 100. In various implementations, the frequency with which scout packets are injected into a network path 165 can be low enough so that the scout packets do not cause congestion within the network environment 100, but high enough so that dynamic conditions of the network can be continuously monitored.

In the example path 165, the intelligent network elements (e.g., IP telephony media gateway 150, router "B" 145, CMTS 125, and MTA 110*d*) can be operable to identify scout packets, read information from the scout packets, write information to the scout packets, and communicate with a centralized scout processing element. Further, packet degradation (e.g., packet loss, packet delay, etc.) can occur at any of the intelligent network elements or in any of the routes between each of the individual intelligent network elements. In some implementations, scout packets can be routed through other nodes (e.g., router "A" 140) or headend devices (e.g., EQAM 130) based on the density of data traffic in the various routes and based on the natural paths taken by various service types. For example, data packets associated with high-speed data services might normally be routed through the border router 155, the router "A" 140, the router "B" 145, the CMTS 125, and the MTA 110*a*, thus data packets associated with a high-speed data service can be communicated along a different path than data packets associated with other service types (e.g., VoIP, video, etc.). Further in this example, a stream of scout packets associated with the high-speed data service can be communicated along the same natural path as the data packets associated with the high-speed data service and can be operable to characterize QoE levels for the high-speed data service along the natural path of the high-speed data packets.

Figure 2:
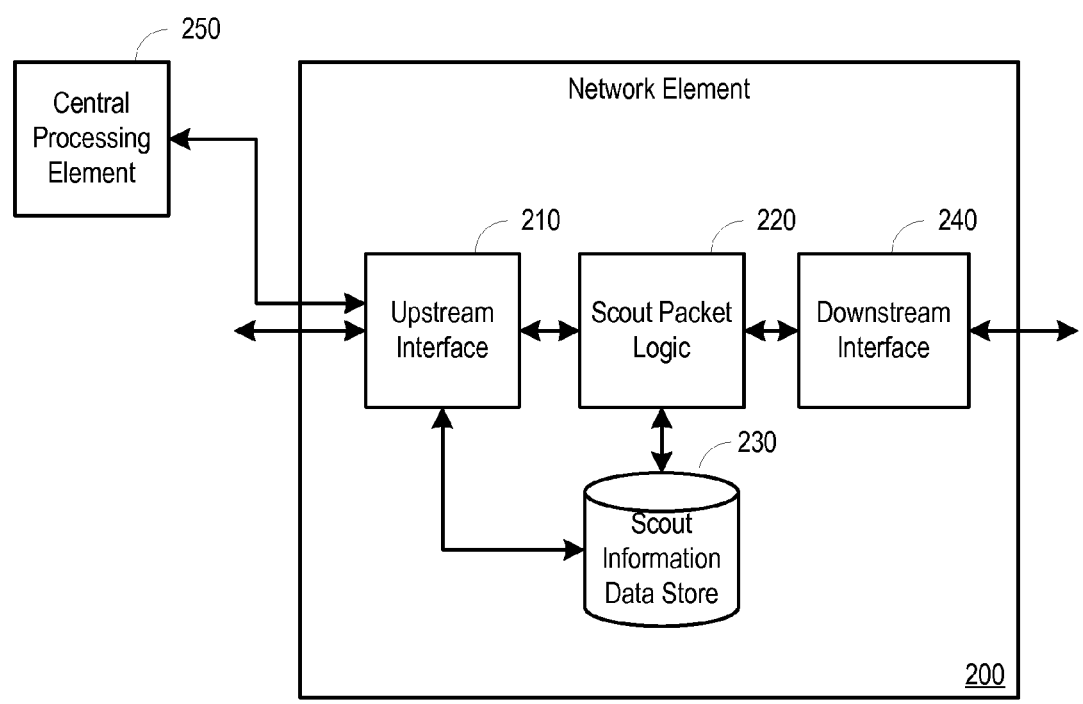
FIG. 2 is a block diagram illustrating an example network element operable to facilitate measuring the QoE of a service within a network.

FIG. 2 is a block diagram illustrating an example network element 200 operable to facilitate measuring the QoE of a service within a network. The network element 200 can be any element in a network (e.g., a router, a node, a CMTS 125, an EQAM, a CPE device, etc.). In some implementations, the network element 200 can include an upstream interface 210, scout packet logic 220, a scout information data store 230, and a downstream interface 240.

In some implementations, the upstream interface 210 can be used to provide an interface to a network (e.g., HFC network 120) or an upstream network element (e.g., a network element between the network element 200 and a source element). For example, the upstream interface 210 can be used to receive a packet stream comprising both data packets and scout packets from an upstream network element or forward packets already processed by the scout packet logic 220 received via the downstream network interface 240. Further, the upstream interface 210 can be used to receive a unique identifier (e.g., unique IP header) to search for within incoming packets. In some implementations, the upstream interface 210 can be used to provide an interface to a central processing element 250. For example, the upstream interface 210 can be used to send information read from scout packets and stored on a network element to a central processing element 250.

In some implementations, the scout packet logic 220 can identify scout packets within incoming packet streams. For example, the scout packet logic 220 can compare a unique identifier received from a central processing element 250 to the IP headers of packets in an incoming packet stream. In some implementations, when an IP header matching the unique identifier is identified, the scout packet logic 220 can read scouting information from the identified packet. For example, the scout packet logic 220 can read scouting information held in the header and/or payload of the packet (e.g., information on the type of packet, the unique identity of the packet, the source of the packet, the destination of the packet, the identity of the network elements the packet has passed through, the time the packet passed through each network element, etc.). In other implementations, when an IP header matching the unique identifier is identified, the scout packet logic 220 can write scouting information onto the payload of the identified packet. For example, the scout packet logic 220 can write timestamp information (e.g., the identity of the network element associated with the scout packet logic and the time at which the packet passed through the network element associated with the scout packet logic) onto the payload of the identified packet. In some implementations, each network element 200 in the path of a packet from a source to a destination can operate to insert or append additional scouting information into the received scout packet. In other implementations, each network element 200 in the path of the packet from a source to a destination can operate to overwrite scouting information included in the packet header from a previous network element 200.

In some implementations, the scout information data store 230 can be used to store information read from an identified packet. The scout information data store 230 can be located in the network element's storage or memory component (e.g., random-access memory (RAM), optical storage, flash memory, etc.). For example, the scout packet logic 220 can read scout information (e.g., information on the type of packet, the unique identity of the packet, the source of the packet, the destination of the packet, the identity of the network elements the packet has passed through, the time the packet passed through each network element, etc.) from the identified packet, and can instruct the scout information data store 230 to store the scout information.

In some implementations, the scout information data store 230 can store a count of the number of times a particular type of scout packet is received by the network element 200 and identified by the scout packet logic 220. For example, when the scout packet logic 220 identifies the first of one or more scout packets of a specific type, the scout packet logic 220 can instruct the scout information data store 230 to start a count for the specific type of scout packet (e.g., simulating a particular type of service). In this example, when the scout packet logic 220 identifies a subsequent scout packet of the same specific type, the scout packet logic 220 can instruct the scout information data store 230 to increase the count for the specific type of scout packet (e.g., increase the count by one). Further, in this example, when the scout packet logic 220 identifies the last of one or more of the specific scout packet type, the count stored in the scout information data store 230 can be sent to the central processing element 250 through the upstream interface 210, and the scout packet logic 220 can instruct the scout information data store 230 to reset the count for the specific type of scout packet (e.g., simulated service).

In some implementations, the downstream interface 240 can be operable to pass packets to downstream network elements (e.g., the destination element or network elements between the network element 200 and the destination element). For example, the scout packet logic 220 can identify a scout packet's destination element (e.g., through the scout packet's IP header) and direct the scout packet to the next network element in a path to the scout packet's destination element. In some implementations, there can be more than one path for a scout packet to reach its destination element, and the scout packet logic 220 can direct the scout packet to the next network element along the natural path that would typically be used by the data traffic associated with the particular service type that is being monitored by the scout packet. For example, scout packets associated with different service types (e.g., web-browsing, MSO-managed unicast IP video, MSO-managed multicast IP video, over-the-top unicast IP video, peer-to-peer downloading, on-line gaming, VoIP telephony, etc.) can be directed along the same path as the data packets associated with the service type that is being monitored by the scout packets. By traveling the same path as the data traffic, the scout packets experience the same network conditions that are experienced by the data traffic associated with the service type being monitored. In various implementations, scout packets associated with one service type may be directed along a different path from the path used by scout packets associated with a different service type.

In some implementations, the capability of scout packets to be intelligently steered by the network elements can allow the scout packets to be used for monitoring the QoE of upstream service types (e.g., data packets propagating from a CPE device 110a-d to a headend 105) and can also be used for monitoring the QoE of downstream service types (e.g., data packets propagating from a headend 105 to a CPE device 110a-d). In various implementations, scout packets can be injected at a source element (e.g., at the IP telephony media gateway 150), directed through a path to the destination element (e.g., at the MTA 110d), turned around at the destination element and sent back through the same path, in the opposite direction, to the network element that originally created and injected the scout packets (e.g., the source element), thereby creating a circular path that starts and ends at the same point in the path of the scout packets. As an example, the source element and the destination element in the circular path can be any network element along the path of data packets associated with the service type being monitored. As another example, a single stream of scout packets can be launched to measure QoE levels for both the upstream path and the downstream path for a particular service type.

In additional or alternative implementations, the capability to intelligently steer scout packets through the network elements can facilitate identification or discovery of alternative routing paths for various types of traffic. For example, if a given type of service is experiencing degraded performance, scout packets can be sent along alternative paths of the network, and the resulting measurements from those scout packets can be used to infer relative network conditions on those alternative network paths.

In some implementations, collection of statistical data from a scout packet can be accomplished by writing data (e.g., data identifying a network element through which the scout packet passed, a time at which the scout packet passed through a network element, etc.) from a network element into the scout packet itself, and, when the scout packet arrives at the destination element, extracting and storing the data for transmission to a central processing element. In other implementations, collection of statistical data from a scout packet can be accomplished by a network element capturing a unique identifier from a scout packet, storing the unique identifier (e.g., storing the unique identifier as a counter value), and storing a time at which the scout packet passed through the network element. For example, the statistical data (e.g., unique identifier data, timing data, etc.) can be stored in a memory within a network element when the scout packet passes through the network element. Further in this example, a list of statistical data can be created by and stored within a network element which can contain statistical data collected from multiple scout packets that pass through the network element. Further still, in this example, the statistical data stored by the network element can be transmitted to a central processing element or, as an alternative, can be extracted from the network element by a special scout packet that can gather statistical data from one or more network elements and can transport the statistical data to a destination element where the data can be transmitted to a central processing element.

In some implementations, a client's personal device (e.g., home devices 115a-d) can be included within a scout packet path. In various implementations, scout packet logic 220 and/or a scout information data store 230 can be embedded within a home device 115a-d. For example, applications capable of being downloaded by subscribers onto their home devices 115a-d (e.g., personal computers, smartphones, etc.) can carry scout packet processing algorithms and can participate in scout packet operations. Using such applications, a network operator can diagnose QoE problems that originate within a subscriber's personal device.

In some implementations, scout packets can contain header segments designating a level of priority treatment that the scout packet is to receive from the various network elements in a network environment 100. For example, a CMTS 125 can provide a mechanism referred to as service flow treatment, in which a network operator can instruct the CMTS to offer a high priority/high bandwidth service and service flow to specified subscribers (e.g., a high-paying subscriber) while offering a low priority/low bandwidth service and service flow to other specified subscribers (e.g., a low-paying subscriber). Further in this example, scout packets can be organized by the CMTS 125 (e.g., based on pre-specified header information in the scout packet) into the specific service flow type associated with the scout packet header, and the scout packets can receive appropriate treatment from the CMTS packet scheduling algorithm (e.g., transmitted over the appropriate bandwidth service flow) based on the service flow type associated with the scout packet. In some implementations, during periods of congestion with a network environment, data packets that are classified into high priority/high bandwidth service flows can be given preferential treatment and can be scheduled to propagate through an HFC network more quickly than data packets that are classified into low priority/low bandwidth service flows. In order to accurately monitor the QoE performance for both high priority/high bandwidth subscribers and low priority/low bandwidth subscribers, the network operator can launch scout packet streams associated with both high priority/high bandwidth service flow and low priority/low bandwidth service flow for service types offered by network operators (e.g., web-browsing, MSO-managed unicast IP video, MSO-managed multicast IP video, over-the-top unicast IP video, peer-to-peer downloading, online gaming, VoIP telephony, etc.).

In some implementations, collection of scouting information from scout packets or network elements can be simplified when data paths and priority/bandwidth treatment for multiple service types are the same. For example, a single scout packet stream can be used to collect QoE information along a particular path for all of the service types that share the particular path and share a common set of priority/bandwidth treatments.

In some implementations, collection of scouting information from scout packets or network elements can be simplified when a network operator assumes that the QoE performance for a particular service type passing through a particular priority/bandwidth service flow for a particular subscriber is the same as or similar to the QoE performance for the same particular service type passing through the same particular priority/bandwidth service flow for one or more different subscriber where the one or more different subscribers are in the same service group (e.g., a group of subscribers receiving the same set of channels). In this simplification, the network operator can further assume that packet degradation (e.g., packet loss, packet delay, packet jitter, etc.) is not caused by the home network(s) or home device(s) of the particular subscriber and the one or more different subscribers. In various implementations, for a particular service group, scout packet streams can only be sent for each of the service types offered by the network operator (e.g., web-browsing, MSO-managed unicast IP video, MSO-managed multicast IP video, over-the-top unicast IP video, peer-to-peer downloading, online gaming, VoIP telephony, etc.) to a subscriber in the particular service group with a high priority/high bandwidth service flow and to a subscriber in the particular service group with a low priority/low bandwidth service flow, thereby allowing the network operator to infer the QoE performance for the other subscribers in the particular service group from the measurements produced by these scout packet streams.

In some implementations, a central processing element 250 can be operable to collect scout information (e.g., scout packet data) from network elements and determine packet degradation (e.g., packet loss, packet delay, packet jitter, etc.) along a packet stream path. The central processing element 250 can collect scout information from the network elements using any one of a plurality of different techniques. For example, the central processing element can send query messages to each of the individual network elements, and each of the individual network elements can send scout information to the central processing element in response to the query, thereby creating a pull model for data collection. As another example, each of the network elements can periodically transmit scout information stored by the network elements to the central processor 250, thereby creating a push model for data collection. As still another example, a special scout packet passing through each of the network elements can collect scout information stored by the network elements and carry the scout information collected from the network elements to an endpoint or destination network element. In this example, the scout information collected from the network elements can be aggregated by the endpoint or destination network element, and the aggregated scout information can be either pulled from the endpoint network element (e.g., the central processing element requests the aggregated scout information from the destination element, and the destination element transmits the aggregated scout information to the central processing element in response) or can be pushed from the endpoint network element (e.g., the destination element periodically transmits the aggregated scout information to the central processing element) into the central processing element 250.

In some implementations, the central processing element 250 can use data on the number of scout packets identified by each network element to determine packet loss in each of the one or more hops (e.g., the sections of a scout packet path that connect one network element to the next network element) along the one or more scout packet paths. In other implementations, the central processing element 250 can use the times at which each scout packet was identified by each network element to determine packet delay in each of the one or more hops along the one or more scout packet paths. In various implementations, the central processing element 250 can use the times at which each scout packet was identified by each network element to determine packet jitter statistics in each of the one or more hops along the one or more scout packet paths. In still other implementations, the central processing element 250 can use data on the number of scout packets identified by each network element within a predetermined period of time to determine network traffic bandwidth levels in each of the one or more hops along the one or more scout packet paths.

In other implementations, a central processing element 250 can be operable to determine the location of a network problem existing along a packet stream path. For example, the central processing element 250 can identify the network element that reports the largest packet loss or the longest packet delay as a potential location of a network problem. In some implementations, a central processing element 250 can compare a measured packet degradation statistic to a threshold value in order to determine whether a problem exists within the network or the measured packet degradation is normal or acceptable. In further and/or alternative implementations, a central processing element 250 can use compiled scout packet data received from network elements to determine the path taken by scout packets of a certain type. In some implementations, the central processing element 250 can be located in a scout packet's destination element, a scout packet's source element, or any other network element in the network 100 of FIG. 1A.

Figure 3A:
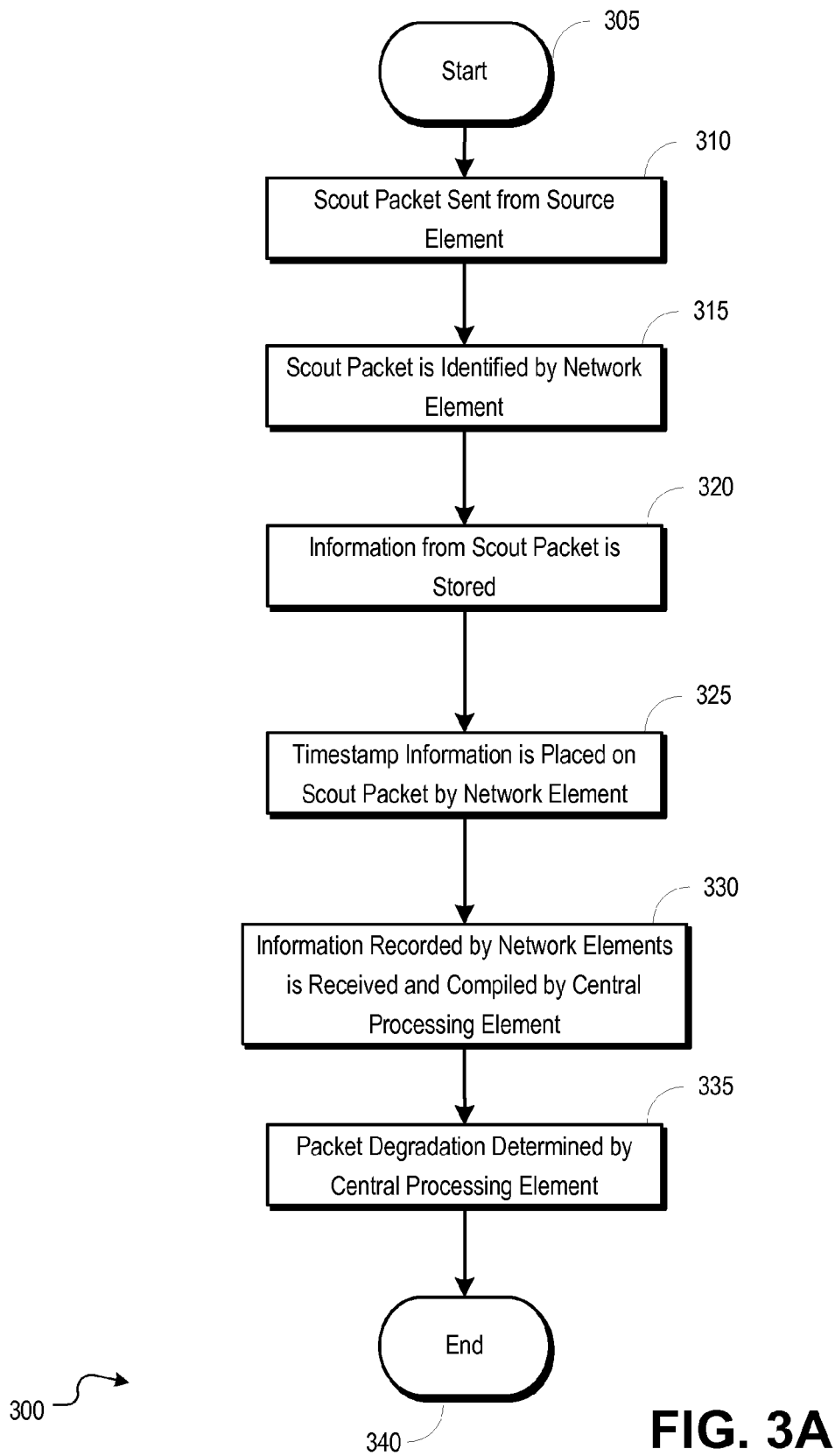
FIG. 3A is a flowchart illustrating an example process operable to facilitate measuring the QoE of a service within a network.

FIG. 3A is a flowchart illustrating an example process 300 operable to facilitate measuring the QoE of a service within a network. The process 300 can start at stage 305 when a scout packet is created at a source element. The scout packet can be created, for example, at a source element associated with the service type being measured and by the instruction of a system administrator or automatically generated based on a predefined periodicity or trigger (e.g., subscriber input). For example, if a downstream VoIP service is measured, the source element can be an IP telephony media gateway 150 of FIG. 1A. In another example, if an upstream VoIP service is being measured, the source element can be an MTA 110d of FIG. 1A. In some implementations, the scout packet can contain a unique identifier (e.g., a unique destination IP address, a unique source IP address, a unique value in the type of service (ToS) or differentiated services codepoint (DSCP), or any combination thereof, etc.).

After the scout packet is created, the process 300 can proceed to stage 310. At stage 310, a scout packet can be sent from the source element. The scout packet can be sent, for example, by a source element associated with the service type being measured. For example, if a downstream web-browsing service is being measured, the source element can be a border router 155 of FIG. 1A. In another example, if an upstream web-browsing service is being measured, the source element can be a cable modem 110a. In some implementations, the scout packet can be mixed in with data packets leaving the source element. In some implementations, a burst of scout packets can be sent from the source element wherein the individual scout packets are sent at a frequency which ensures that the scout packets remain a small percentage (e.g., less than 0.1%) of the total number of packets within the system.

After the scout packet is sent, the process 300 can proceed to stage 315. At stage 315, a scout packet can be identified by a network element. The scout packet can be identified, for example, by the logic of a network element along the path of the packet stream associated with the scout packet (e.g., scout packet logic 220 of FIG. 2 of a network element 200 of FIG. 2). In some implementations, the network element can distinguish the scout packet from data packets based upon the unique identifier of the scout packet. For example, as packets pass through a network element, the scout packet logic of the network element can compare the packet headers to unique identifiers designated for use by scout packets.

After the scout packet is identified, the process 300 can proceed to stage 320. At stage 320, information from a scout packet can be stored. The information from a scout packet can be stored, for example, in a data store (e.g., a scout information data store 230 of FIG. 2). In some implementations, the scout packet logic can identify scout information carried by a scout packet (e.g., information held in the header or the payload of a scout packet) and direct the information to be stored in a scout information data store. In various implementations, the scout information carried by the scout packet can include the packet's source element, the packet's destination element, an identification of the elements the packet has passed through, the time at which the packet passed through other elements in the network, as well as other information. In some implementations, a packet information data store can keep a running count of the number of scout packets that have passed through a network element. For example, when the scout packet logic identifies a scout packet passing through the network element, the scout packet logic can increase the count associated with the particular type of scout packet that is stored in a scout information store. In this example, the scout packet logic can clear the count stored by the scout information data store after a predetermined period of time or when a packet is identified which directs the scout packet logic to clear the stored count or which informs the scout packet logic that the identified packet is the last scout packet in a particular burst of scout packets.

After information from the scout packet is stored, the process 300 can proceed to stage 325. At stage 325, information can be placed on the scout packet. The scouting information can be written into the scout packet, for example, by a network element (e.g., through the network element's scout packet logic 220 of FIG. 2). In some implementations, network elements can acquire synchronized global timing information and maintain a clock (e.g., through network time protocol (NTP), a DOCSIS timing interface (DTI) server, etc.). Also, scout packets can allocate a region within their payload wherein information can be added. For example, each network element that a scout packet passes through can add to the payload of the scout packet, information identifying the particular network element and the time at which the scout packet passed through the particular network element. In some implementations, the size of the region in a scout packet's payload allocated to storing information received from network elements can be based upon the number of network elements the scout packet is expected to pass through. Alternatively, each network element can encapsulate the previous scout packet to generate a new scout packet that includes the old scout packet in the payload segment of the new scout packet. In various implementations, after new scout information is placed on a scout packet, the updated scout packet can be sent to a next network element along the scout packet path.

After information is written into a scout packet, the process 300 can proceed to stage 330. At stage 330, scout information stored by network elements can be aggregated, compiled, and/or analyzed. The scout information read from scout packets and stored by network elements can be received and compiled, for example, by logic within a network element (e.g., a central processing element 250 of FIG. 2). In some implementations, a central processing element can be located at a headend and can be operable to receive information gathered and stored by network elements. For example, scout information received by network elements from scout packets (e.g., count information or timestamp information) can be sent to a central processing element, and the central processing element can compile and analyze the received information associated with the same burst of scout packets and/or the same service type. In various implementations, a central processing element can be the source element of a scout packet, the destination element of a scout packet, or any other element within a network. The central processing element may be in the path of the scout packet or may be outside of the path of the scout packet.

Figure 3B:
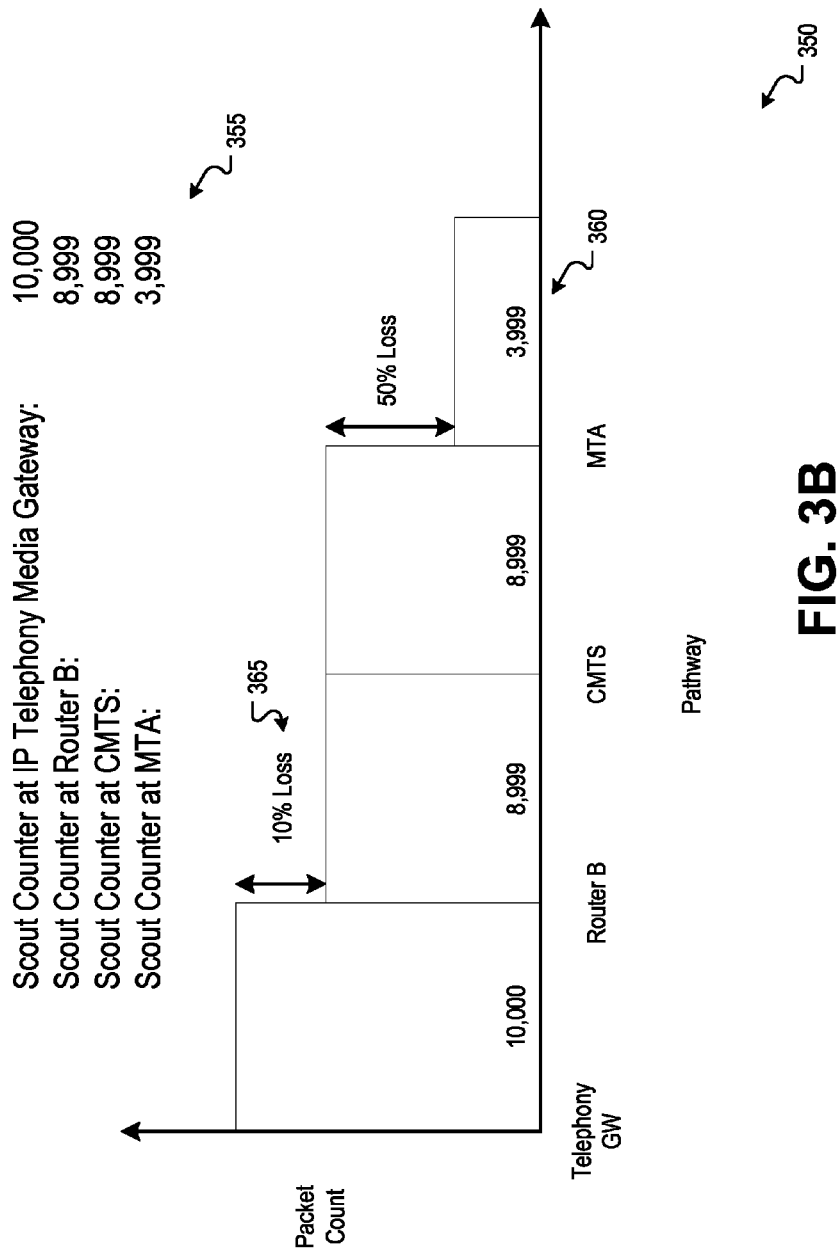
FIG. 3B is an illustration of an example display that provides a network operator with data on the packet loss of a service type within a network.

After scout information is stored and compiled by a central processing element, the process 300 can proceed to stage 335. At stage 335, the level of packet degradation can be measured. The QoE level for the service represented by the scout packet can be determined by inference from the level of packet degradation, for example, by logic within a network element (e.g., a central processing element 250 of FIG. 2). In some implementations, the central processing element can compare the count information received by each network element to the number of scout packets sent by a source element. From this comparison, the central processing element can determine the level of packet loss along the path of the scout packets. For example, FIG. 3B is an illustration of an example display 350 that can show data on the packet loss within a packet stream path (e.g., path 165 of FIG. 1B). The example display 350 can show, for example, the scout packet count from each of the network elements along the path of a packet stream (e.g., scout packet count table 355 or scout packet count chart 360) and/or the packet loss occurring at each network element (e.g., the percent of packet loss at each element 365).

Figure 3C:
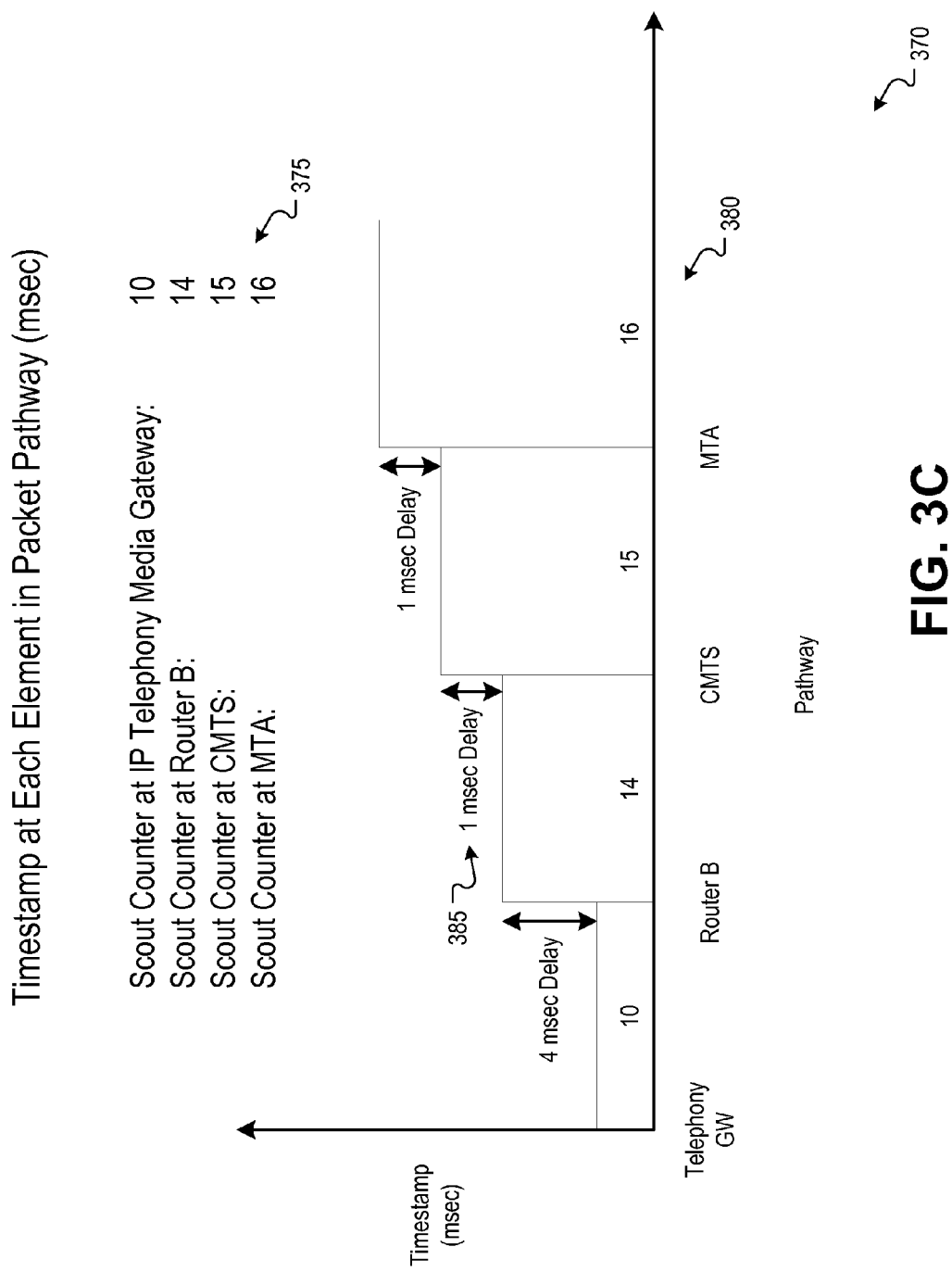
FIG. 3C is an illustration of an example display that provides a network operator with data on the packet delay of a service type within a network.

In some implementations, the central processing element 250 of FIG. 2 can compile the timestamp information received from each network element in order to determine the amount of time taken by a scout packet to travel from the source element to the destination element. From the timestamp information, the central processing element can determine various statistics (e.g., average delay, variance of delay, maximum delay, minimum delay, etc.). For example, FIG. 3C is an illustration of an example display 370 that can show data on the packet delay within a packet stream path (e.g., path 165 of FIG. 1B). The example display 370 can show, for example, the time taken by a scout packet to pass from one network element to the next network element, for each of the hops along the path of a packet stream (e.g., scout packet timestamp table 375 or scout packet timestamp chart 380) and/or the packet delay occurring at each network element (e.g., the time delay at each network element 385). In some implementations, a central processing element can compare packet degradation data to predetermined thresholds to determine whether a problem exists within the network or data stream measured. In some implementations, the central processing element 250 can use packet degradation data to determine which network elements or which packet routes are experiencing a network problem. After packet degradation is determined and/or localized, the process 300 can proceed to stage 340 where the process 300 ends.

In some implementations, the central processing element 250 of FIG. 2 can use scout packet statistics associated with packet degradation in the one or more hops of a scout packet path (e.g., per hop packet delay, per hop jitter, per hop packet loss, per hop bandwidth, per hop bandwidth per subscriber, etc.) to calculate an expected mean opinion score (MOS) (e.g., a measure of a subscriber's QoE level for a particular service type) or other quality measurement for each service type. For example, FIG. 3D is an illustration of an example display 390 that can show the calculated MOS for one or more priority/bandwidth flow types associated with a plurality of service types (e.g., web-browsing, MSO-managed unicast IP video, MSO-managed multicast IP video, over-the-top unicast IP video, peer-to-peer downloading, on-line gaming, VoIP telephony, etc.). While the example display 390 shows the calculated MOS for high priority/bandwidth and low priority/bandwidth flow types associated with seven different service types, it should be understood that MOSs can be calculated and displayed for a variety of other service types or some subset of these service types. In some implementations, the example display 390 can show an average of the calculated MOSs for all of the service types measured. In various implementations, an MOS can be represented by a value ranging from 5 (for perfect) to 1 (for unacceptable), however, it should be understood that the MOS can be represented by various other quality classifications associated with various ranges. In some implementations, each of the plurality of service types can be sensitive to different scout packet statistics, thus the calculation of an MOS, or other quality measurement, for each of the plurality of service types can be based on a unique and potentially different formula that maps the collected statistics into an MOS, or other quality measurement, for each service type. For example, a web-surfing service type may be sensitive to bandwidth per subscriber statistics and less sensitive to packet delay, packet jitter and packet loss statistics. As another example, the on-line gaming service type may be sensitive to packet delay, packet jitter and/or packet loss statistics, and less sensitive to bandwidth per subscriber statistics. In some implementations, the MOS for each of a plurality of service types can be calculated using a unique formula that weighs the various scout packet statistics differently for each service type. For example, the formula used to calculate the MOS for each of the plurality of service types can place varying weights on each of one or more formula parameters (e.g., scout packet statistics including packet delay, packet jitter, packet loss, bandwidth per subscriber, etc.) based on the sensitivities unique to each service type. In some implementations, the calculated MOS for a service type can be different for high priority/high bandwidth service flows of the service type than the calculated MOS for low priority/low bandwidth service flows of the same service type. As shown in the example display 390, MOS calculations can vary between different service types and between different service flows.

Figure 4:
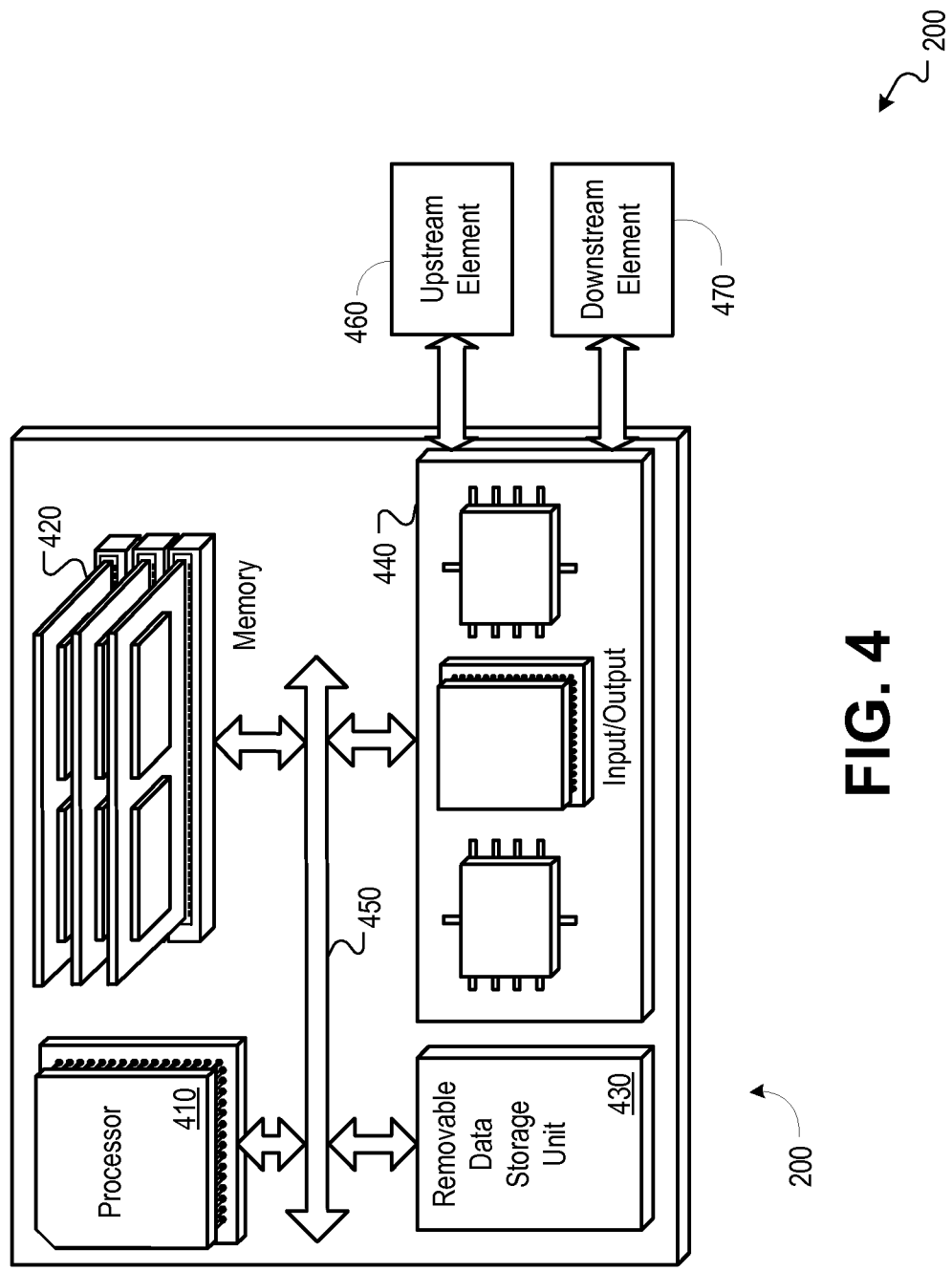
FIG. 4 is a block diagram of a hardware configuration for a network element operable to facilitate measuring the QoE of a service within a network.

FIG. 4 is a block diagram of a hardware configuration for a network element 200 operable to facilitate measuring the QoE of a service within a network. While a generic network element 200 is shown in this example, it should be understood that many different kinds of devices (e.g., including network hubs, bridges, routers, edge termination devices, etc.) can implement a method to measure the QoE of a service within a network. The network element 200 can include a processor 410, a memory 420, a storage device 430, and an input/output device 440. Each of the components 410, 420, 430, and 440 can, for example, be interconnected using a system bus 450. The processor 410 can be capable of processing instructions for execution within the network element 200. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration of the network element 200. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the network element 200. In one implementation, the storage device 430 can be a computer-readable medium. In various different implementations, the storage device 430 can, for example, include a hard disk device, an optical disk device, flash memory or some other large capacity storage device.

The input/output device 440 provides input/output operations for the network element 200. In some implementations, the input/output device can include driver devices configured to receive input data from and send output data to an upstream network element 460. In some implementations, the input/output device can include driver devices configured to receive input data from and send output data to a downstream network element 470. In another implementation, the input/output device can include driver devices configured to receive input data from and send output data to other input/output devices, such as one or more other network elements or CPE devices (e.g., set top box, cable modem, etc.), as well as sending communications to, and receiving communications from a network 120 of FIG. 1.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
    sending one or more scout packets from a source element to a destination element;
    wherein each respective one of the one or more scout packets comprises a service-type identifier associating the respective scout packet with a respective one service-type of one or more service-types, and the respective scout packet is routed from the source element to the destination element along a path designated for the routing of data packets of the respective one service-type, the path comprising one or more network elements;
    identifying at least one scout packet at one or more of the network elements traversed by the scout packet between the source element and the destination element;
    at each of the one or more network elements, reading timestamp information from the identified scout packet, the read timestamp information identifying one or more elements previously traversed by the scout packet and the time at which the scout packet was received by each previously traversed element;
    at each of the one or more network elements, writing timestamp information to the identified scout packet, the written timestamp information identifying the respective network element and the time at which the scout packet was received by the respective network element;
    retrieving timestamp information associated with each of the one or more network elements traversed by the one or more scout packets; and
    for each respective one of the one or more service-types, analyzing the timestamp information associated with each of one or more scout packets associated with the respective one service-type to identify potential service degradation along the path designated for the routing of data packets of the respective one service-type, and to further identify one or more network elements traversed by the one or more scout packets as a potential source of the potential service degradation.

2. The computer-implemented method of claim 1, wherein each of the one or more scout packets utilizes a unique identifier.

3. The computer-implemented method of claim 1, wherein scout packets are sent at predetermined rates.

4. The computer-implemented method of claim 1, further comprising:
    maintaining a count of the number of scout packets identified.

5. The computer-implemented method of claim 1, further comprising:
    storing scout information carried by the scout packet.

6. The computer-implemented method of claim 5, wherein the scout information stored comprises a unique identifier for at least one network element traversed by the scout packet and a time at which the scout packet was identified by the network element.

7. The computer-implemented method of claim 1, further comprising:
    compiling and analyzing scout information produced by network elements along the paths of the plurality of packets.

8. The computer-implemented method of claim 7, wherein the scout information is compiled by a scout packet passing through each of the network elements, collecting scout information stored by the network elements and carrying the scout information collected from the network elements to an endpoint or destination element.

9. The computer-implemented method of claim 7, further comprising:
    displaying the compiled scout information and associated potential service degradation data.

10. The computer-implemented method of claim 1, further comprising:
    sending one or more scout packets from the destination element to the source element along the same path and in the opposite direction as the path traversed by the one or more scout packets during transmission from the source element to the destination element.

11. The computer-implemented method of claim 1, further comprising:
    wherein each of the one or more network elements maintains a count of the number of scout packets received during a predetermined duration;
    retrieving the count of received scout packets from each of the one or more network elements; and
    comparing the retrieved counts to the number of scout packets sent from the source element to identify potential instances of dropped packets at the one or more network elements.

12. A network element, comprising:
    a data store operable to store computer program instructions and provide storage for scout information carried by a scout packet in transit between a source element and a destination element, wherein the scout packet comprises a service-type identifier associating the scout packet with a respective one service-type of one or more service-types, and the scout packet is routed from the source element to the destination element along a path designated for the routing of data packets of the respective one service-type, the path comprising one or more network elements;
    a processor operable to execute said computer program instructions, the computer program instructions being operable to cause the processor to:
        identify the scout packet in a packet stream;
        read timestamp information from the identified scout packet, the read timestamp information identifying one or more elements previously traversed by the scout packet and the time at which the scout packet was received by each previously traversed element; and write timestamp information to the identified scout packet, the written timestamp information identifying the network element and the time at which the scout packet was received by the network element;

a network interface operable to communicate collected timestamp information carried by the scout packet to a central processing element, wherein the collected timestamp information is used to identify potential service degradation between the source element and destination element along the path designated for the routing of data packets of the respective one service-type, and to further identify one or more network elements traversed by the identified scout packet as a potential source of the potential service degradation.

13. The system of claim 12, wherein the scout packet utilizes a unique identifier.

14. The system of claim 12, wherein the data store is further operable to:
maintain a count of the number of scout packets identified.

15. The system of claim 12, wherein the scout information carried by the identified scout packet comprises a unique identifier for at least one network element through which the scout packet passed and a time at which the scout packet was identified by the network element.

16. The system of claim 12, wherein the computer program instructions are further operable to cause the processor to write new scout information to the identified scout packet.

17. The system of claim 12, wherein the central processing element is operable to compile and analyze scout information communicated by network elements.

18. The system of claim 17, wherein the central processing element is further operable to communicate the compiled scout information and associated potential service degradation results.

19. One or more non-transitory computer readable media operable to execute on a processor, the computer readable being operable to cause the processor to perform the operations comprising:

identifying one or more scout packets at a network element, wherein each respective one of the one or more scout packets comprises a service-type identifier associating the respective scout packet with a respective one service-type of one or more service-types, and the respective scout packet is routed from a source element to a destination element along a path designated for the routing of data packets of the respective one service-type, the path comprising one or more network elements;

reading timestamp information from each of the one or more identified scout packets, the read timestamp information identifying one or more elements previously traversed by the respective scout packet and the time at which the respective scout packet was received by each previously traversed element;

writing timestamp information to each of the one or more identified scout packets, the written timestamp information identifying the network element and the time at which the respective scout packet was received by the network element; and for each respective one of the one or more service-types, analyzing information contained within the one or more scout packets associated with the respective one service-type to identify potential service degradation in the path designated for the routing of data packets of the respective one service-type, and to further identify one or more network elements traversed by the one or more scout packets as a potential source of the potential service degradation.

20. The one or more non-transitory computer-readable media of claim 19, wherein the one or more scout packets utilize a unique identifier.

21. The one or more non-transitory computer-readable media of claim 19, wherein scout packets are known to have been sent at predetermined rates.

22. The one or more non-transitory computer-readable media of claim 19, further comprising:
maintaining a count of the number of scout packets identified.

23. The one or more non-transitory computer readable media of claim 19, further comprising:
storing scout information carried by the scout packet.

24. The one or more non-transitory computer readable media of claim 23, wherein the scout information stored comprises one or more unique identifiers for the one or more network elements through which the scout packet passed and a time at which the scout packet was identified by the one or more network elements.

25. The one or more non-transitory computer-readable media of claim 19, further comprising:
writing new scout information to the identified scout packet.

26. The one or more non-transitory computer-readable media of claim 25, wherein the new scout information comprises a unique identifier identifying the network element writing the information and timing data identifying a time at which the network element identified the scout packet.

* * * * *